(12) United States Patent
Handa

(10) Patent No.: US 12,008,414 B2
(45) Date of Patent: Jun. 11, 2024

(54) INFORMATION PROCESSING APPARATUS, INFORMATION PROCESSING METHOD, AND INFORMATION PROCESSING PROGRAM

(71) Applicant: Sony Semiconductor Solutions Corporation, Kanagawa (JP)

(72) Inventor: Yuji Handa, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 17/439,743

(22) PCT Filed: Mar. 5, 2020

(86) PCT No.: PCT/JP2020/009305
§ 371 (c)(1),
(2) Date: Sep. 15, 2021

(87) PCT Pub. No.: WO2020/195658
PCT Pub. Date: Oct. 1, 2020

(65) Prior Publication Data
US 2022/0180628 A1 Jun. 9, 2022

(30) Foreign Application Priority Data
Mar. 22, 2019 (JP) ................................ 2019-054900

(51) Int. Cl.
*G01S 13/86* (2006.01)
*B60W 60/00* (2020.01)
(Continued)

(52) U.S. Cl.
CPC ......... *G06F 9/5066* (2013.01); *B60W 60/001* (2020.02); *G01S 13/867* (2013.01);
(Continued)

(58) Field of Classification Search
None
See application file for complete search history.

(56) References Cited

U.S. PATENT DOCUMENTS

2006/0245264 A1* 11/2006 Barr .................. G06F 9/5066
714/E11.061
2018/0052746 A1* 2/2018 Chowdhary ........ G06F 11/3024
(Continued)

FOREIGN PATENT DOCUMENTS

CN 110476173 A * 11/2019 ......... G06F 16/9024
DE 10 2014 103136 A1 9/2014
(Continued)

OTHER PUBLICATIONS

International Search Report and Written Opinion dated Jun. 9, 2020 in connection with International Application No. PCT/JP2020/009305.

(Continued)

*Primary Examiner* — Mohammed Rachedine
(74) *Attorney, Agent, or Firm* — Wolf, Greenfield & Sacks, P.C.

(57) ABSTRACT

An information processing apparatus comprising, at least one first processor configured to carry out a first process on data input from at least one sensor to produce first processed data, a selector configured to select, according to a first predetermined condition, at least one of a plurality of second processes, and at least one second processor configured to receive the first processed data from the at least one first processor and to carry out the selected at least one of the plurality of second processes on the first processed data to produce second processed data, each of the plurality of second processes having a lower processing load than the first process.

19 Claims, 10 Drawing Sheets

(51) Int. Cl.
*G01S 13/931* (2020.01)
*G06F 9/48* (2006.01)
*G06F 9/50* (2006.01)
*G06F 18/2413* (2023.01)
*G06F 18/25* (2023.01)
*G06N 3/08* (2023.01)
*G06V 10/70* (2022.01)
*G06V 10/764* (2022.01)
*G06V 10/80* (2022.01)
*G06V 10/82* (2022.01)
*G06V 10/94* (2022.01)
*G06V 10/96* (2022.01)
*G06V 20/58* (2022.01)

(52) U.S. Cl.
CPC .......... *G01S 13/931* (2013.01); *G06F 9/4881* (2013.01); *G06V 10/764* (2022.01); *G06V 10/80* (2022.01); *G06V 10/806* (2022.01); *G06V 10/82* (2022.01); *G06V 10/87* (2022.01); *G06V 10/94* (2022.01); *G06V 10/955* (2022.01); *G06V 10/96* (2022.01); *G06V 20/58* (2022.01); *G06V 20/584* (2022.01); *B60W 2420/40* (2013.01); *B60W 2420/403* (2013.01); *B60W 2420/408* (2024.01); *B60W 2420/54* (2013.01); *G06V 2201/08* (2022.01)

(56) References Cited

U.S. PATENT DOCUMENTS

| | | |
|---|---|---|
| 2018/0144202 A1 | 5/2018 | Moosaei |
| 2018/0336430 A1 | 11/2018 | Sato et al. |
| 2019/0087736 A1* | 3/2019 | Kita ...................... G06F 18/285 |
| 2020/0089975 A1 | 3/2020 | Gerardon et al. |
| 2020/0218878 A1* | 7/2020 | Mequanint ........... G08B 21/182 |
| 2021/0326585 A1* | 10/2021 | Tu ........................ G06V 40/193 |
| 2022/0156311 A1* | 5/2022 | Akimoto ............... G06F 16/538 |

FOREIGN PATENT DOCUMENTS

| | | | | |
|---|---|---|---|---|
| DE | 102014103136 A1 * | 9/2014 | ......... G06K 9/00536 |
| DE | 10 2016 225 876 A1 | 6/2018 | |
| JP | 2004-199148 A | 7/2004 | |
| JP | 2008171140 A | 7/2008 | |
| JP | 2010271788 A | 12/2010 | |
| JP | 2011014038 A | 1/2011 | |
| JP | 2012033149 A | 2/2012 | |
| JP | 2018010568 A * | 1/2018 | ......... G06K 9/00805 |
| JP | 2018041209 A | 3/2018 | |
| JP | 2018195097 A | 12/2018 | |
| WO | WO-2019013919 A1 * | 1/2019 | ........... G06F 9/5033 |

OTHER PUBLICATIONS

Bauer et al., FPGA-GPU architecture for kernel SVM pedestrian detection. 2010 IEEE Computer Society Conference on Computer Vision and Pattern Recognition-Workshops. 2010. p. 61-68.

Mukhtar et al., Vehicle detection techniques for collision avoidance systems: A review. IEEE transactions on intelligent transportation systems. Oct. 2015; 16(5):2318-38.

* cited by examiner

FIG.7
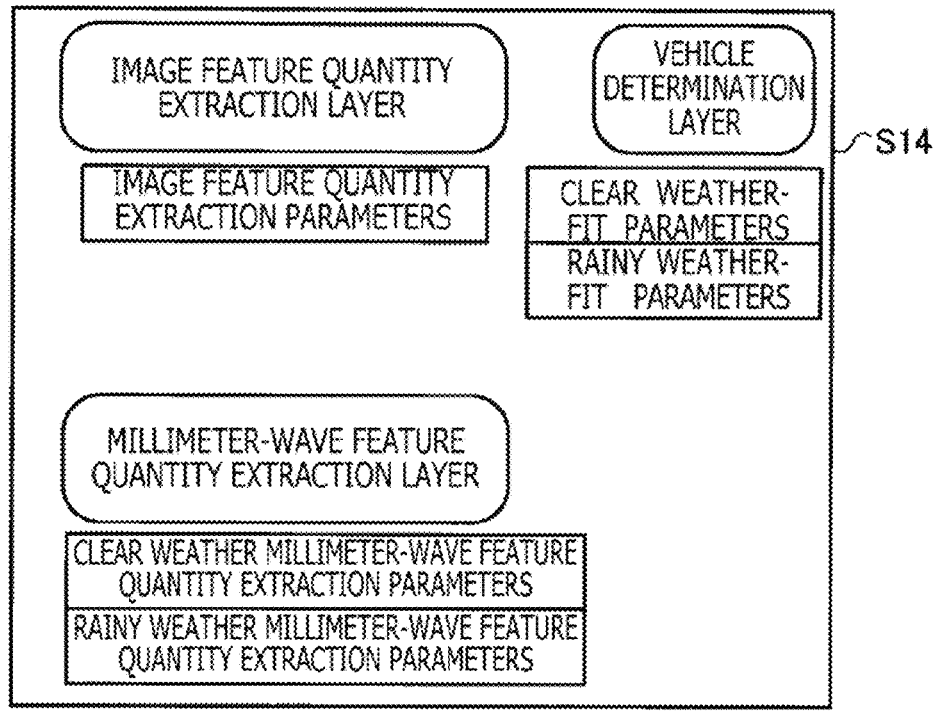
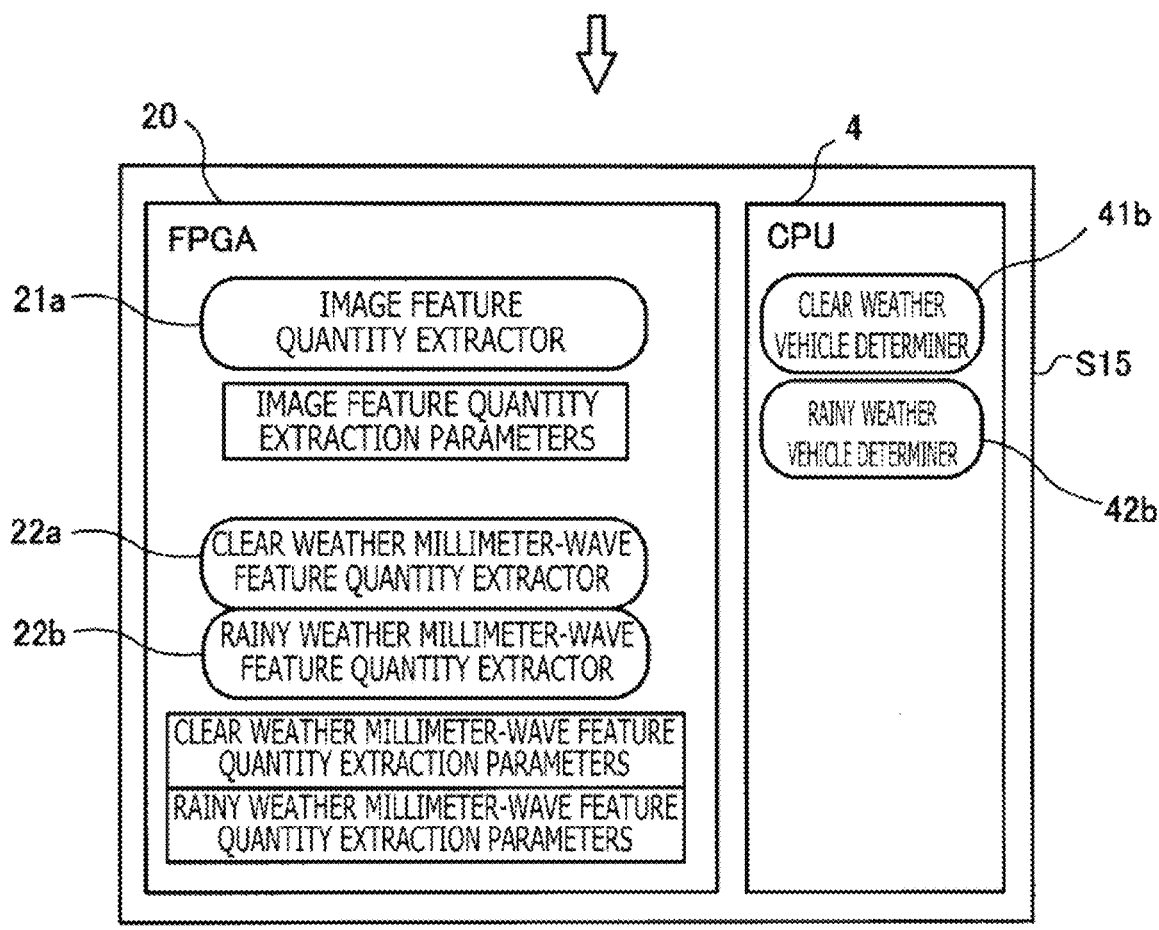

INFORMATION PROCESSING APPARATUS, INFORMATION PROCESSING METHOD, AND INFORMATION PROCESSING PROGRAM

CROSS-REFERENCE TO RELATED APPLICATIONS

This application claims the benefit under 35 U.S.C. § 371 as a U.S. National Stage Entry of International Application No. PCT/JP2020/009305, filed in the Japanese Patent Office as a Receiving Office on Mar. 5, 2020, which claims priority to Japanese Patent Application Number JP2019-054900, filed in the Japanese Patent Office on Mar. 22, 2019, each of which is hereby incorporated by reference in its entirety.

TECHNICAL FIELD

The present disclosure relates to an information processing apparatus, an information processing method, and an information processing program.

BACKGROUND ART

There has been known an information processing apparatus that performs an image recognition process using a processor such as a CPU (Central Processing Unit) or the like (see, for example, PTL 1).

CITATION LIST

Patent Literature

PTL 1: JP 2004-199148 A

SUMMARY

Technical Problem

However, in a case an information processing apparatus is to execute a plurality of tasks having different applications, it is necessary for the information processing apparatus to store different software for each task. As the number of tasks to be executed grows, increase in the amount of data of the software to be stored in the information processing apparatus tends to pose a problem.

As such, according to the present disclosure, there are proposed an information processing apparatus, an information processing method, and an information processing program that are capable of restraining the amount of data of software to be stored from increasing.

Solution to Problem

An information processing apparatus comprising, at least one first processor configured to carry out a first process on data input from at least one sensor to produce first processed data, a selector configured to select, according to a first predetermined condition, at least one of a plurality of second processes, and at least one second processor configured to receive the first processed data from the at least one first processor and to carry out the selected at least one of the plurality of second processes on the first processed data to produce second processed data, each of the plurality of second processes having a lower processing load than the first process.

BRIEF DESCRIPTION OF DRAWINGS

FIG. 7 is an explanatory diagram of the second machine learning process according to the present disclosure.

DESCRIPTION OF EMBODIMENTS

An embodiment of the present disclosure will be described hereinbelow in detail with reference to the drawings. In the embodiment to be described hereinbelow, identical parts are denoted by identical reference signs, and their redundant description will be omitted.

(1. General Makeup of an Information Processing Apparatus)

Figure 1:
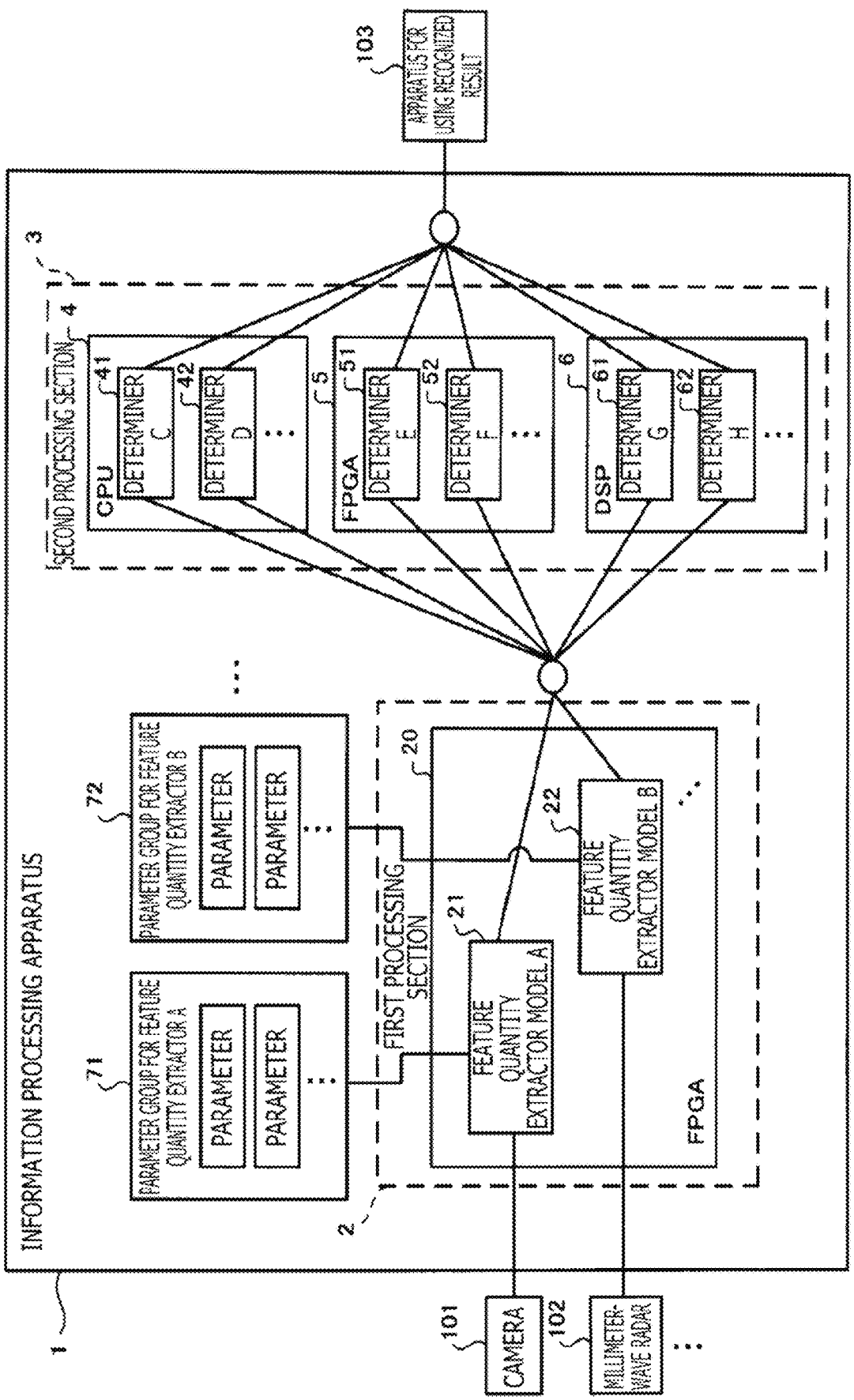
FIG. 1 is an explanatory diagram illustrating an example of a general makeup of an information processing apparatus according to the present disclosure.

FIG. 1 is an explanatory diagram illustrating an example of a general makeup of an information processing apparatus 1 according to the present disclosure. The information processing apparatus 1 will be described hereinbelow as an apparatus that is mounted on a vehicle and determines whether a subject whose image is captured by a camera 101 is a vehicle or a non-vehicle on the basis of image data of the captured image or millimeter-wave data detected by a millimeter-wave radar 102. A target to be determined by the information processing apparatus 1 is not limited to a vehicle and may be any object that can be determined from its image.

The information processing apparatus 1 recognizes a subject from its image using recognizers that are machine-learned by deep learning. The recognizers that are machine-learned by deep learning include models and parameters.

Computational graphs (functions) used by deep learning are generally called models, and are of a multi-layer structure modeled after a human neural network that is designed by a machine learning process in order to recognize features (patterns) of a subject from image data thereof.

A model that includes a plurality of nodes disposed in each layer can be separated at any layer by matching the format (the dimensionality of a multidimensional vector, the size of each dimension, and the total number of elements) of output data from nodes connected as a front stage to the plurality of nodes and the format of input data to nodes connected as a rear stage to the plurality of nodes.

In addition, the parameters are used such that different parameters can be input to a model of one structure. When a different parameter is input to a model, the model behaves differently as a recognizer. For example, when a parameter input to a model is changed, the model is able to recognize a target different from the one before the parameter is changed. Such parameters are acquired by a machine learning process based on deep learning.

Furthermore, in a model, a layer closer to an input end, i.e., a shallower layer, mainly extracts feature quantities of input data. Such a layer closer to an input end frequently uses product-sum operations in order to determine data correlation. Especially in a case where input data are image data, a layer closer to an input end performs multi-dimensional product-sum operations, and undergoes a high processing load. On the other hand, a layer closer to an output end performs processes according to tasks including the classification of a target to be recognized and recurrence. Since a layer closer to an output end generally uses dimensionally reduced data, it undergoes a low processing load compared with a layer closer to an input end.

Now, according to deep learning, transfer learning is performed which is capable of performing a plurality of kinds of tasks by combining a learned common feature quantity extractor and determiners that have learned for respective tasks. In case a plurality of learned recognizers that has performed transfer learning is selectively used in different applications, it is necessary to prepare software corresponding to the respective recognizers, resulting in an increased amount of data of the software stored in an information processing apparatus.

An information processing apparatus is costly as it needs to incorporate a DSP (Digital Signal Processor) for general-purpose applications in order to speed up arithmetic processing. It is therefore difficult to improve its performance by using a built-in deep learning capability.

Consequently, the information processing apparatus 1 according to the present disclosure includes a common feature quantity extractor as a hardware logic in the form of FPGAs (Field Programmable Gate Arrays). Specifically, the information processing apparatus 1 includes a plurality of determiners that are machine-learned for respective tasks, each including a CPU (Central Processing Unit), a DSP, an FPGA, and the like. The plurality of determiners is selectively used according to a task to be performed.

In this manner, the information processing apparatus 1 is able to selectively use a plurality of deep-learned recognizers at a low cost for specific built-in applications while restraining an amount of data of the software to be stored from increasing, resulting in increased recognition performance.

As illustrated in FIG. 1, the information processing apparatus 1 includes the camera 101 and the millimeter-wave radar 102 that are connected to an input side thereof and an apparatus 103 for using a recognized result that is connected to an output side. The information processing apparatus 1 determines whether a subject whose image is captured by the camera 101 is a vehicle or a non-vehicle on the basis of image data of the captured image or millimeter-wave data detected by the millimeter-wave radar 102, and outputs the determined result about a vehicle to the apparatus 103 for using a recognized result. The apparatus 103 for using a recognized result uses the determined result about a vehicle input from the information processing apparatus 1, for controlling an emergency automatic brake system, an automatic drive system, or the like, for example.

The information processing apparatus 1 includes a first processing section 2 (such as a first processor) that carries out a first process such as feature quantity extraction or the like that poses a relatively high processing load, on data input from sensors such as the camera 101 and the millimeter-wave radar 102. The first processing section 2 includes, for example, an FPGA 20 having a relatively high processing rate and suitable for parallel processing, repetitive arithmetic operations, or the like that consumes relatively small electric power.

The first processing section 2 includes a plurality of pre-constructed models for extracting feature quantities, such as a feature quantity extractor model A21 and a feature quantity extractor model B22. The information processing apparatus 1 has parameter groups stored in a memory that include a parameter group 71 for a feature quantity extractor A that is to be input (hereinafter also referred to as "loaded") into the feature quantity extractor model A21 and a parameter group 72 for a feature quantity extractor B that is to be loaded into the feature quantity extractor model B22.

Furthermore, the information processing apparatus 1 includes a second processing section 3 (such as a second processor) that carries out a plurality of second processes different from each other that poses a processing load lower than the first process, on the data on which the first process has been carried out by the first processing section 2. The second processing section 3 includes, for example, a plurality of processing devices such as a CPU 4, an FPGA 5, and a DSP 6. However, the second processing section 3 may include any one of the CPU 4, the FPGA 5, and the DSP 6.

The CPU 4 includes a plurality of determiners such as a determiner C41 and a determiner D42 that function by executing predetermined software. The FPGA 5 includes a plurality of determiners such as a determiner E51 and a determiner F52 that function by executing predetermined software. The DSP 6 includes a plurality of determiners such as a determiner G61 and a determiner H62 that function by executing predetermined software.

The determiner C41, the determiner D42, the determiner E51, the determiner F52, the determiner G61, and the determiner H62 perform respective second processes having different processing contents. Furthermore, the information processing apparatus 1 includes a selecting section 12, to be described later (see FIG. 2), that selects, according to a predetermined condition, a second process to be executed by the second processing section 3.

The information processing apparatus 1 thus arranged can, for example, have the determiner C41 and the determiner D42 share the feature quantity extractor model A21, and can switch between the determiners connected to the feature quantity extractor model A21, thereby outputting the determined result from the determiner C41 and the determined result from the determiner D42.

Therefore, the information processing apparatus 1 can reduce the amount of data of the software to be stored compared with the case where software of the respective feature quantity extractor models is to be stored for each of the determiner C41 and the determiner D42, for example.

(2. Example of the Makeup of the Information Processing Apparatus)

Figure 2:
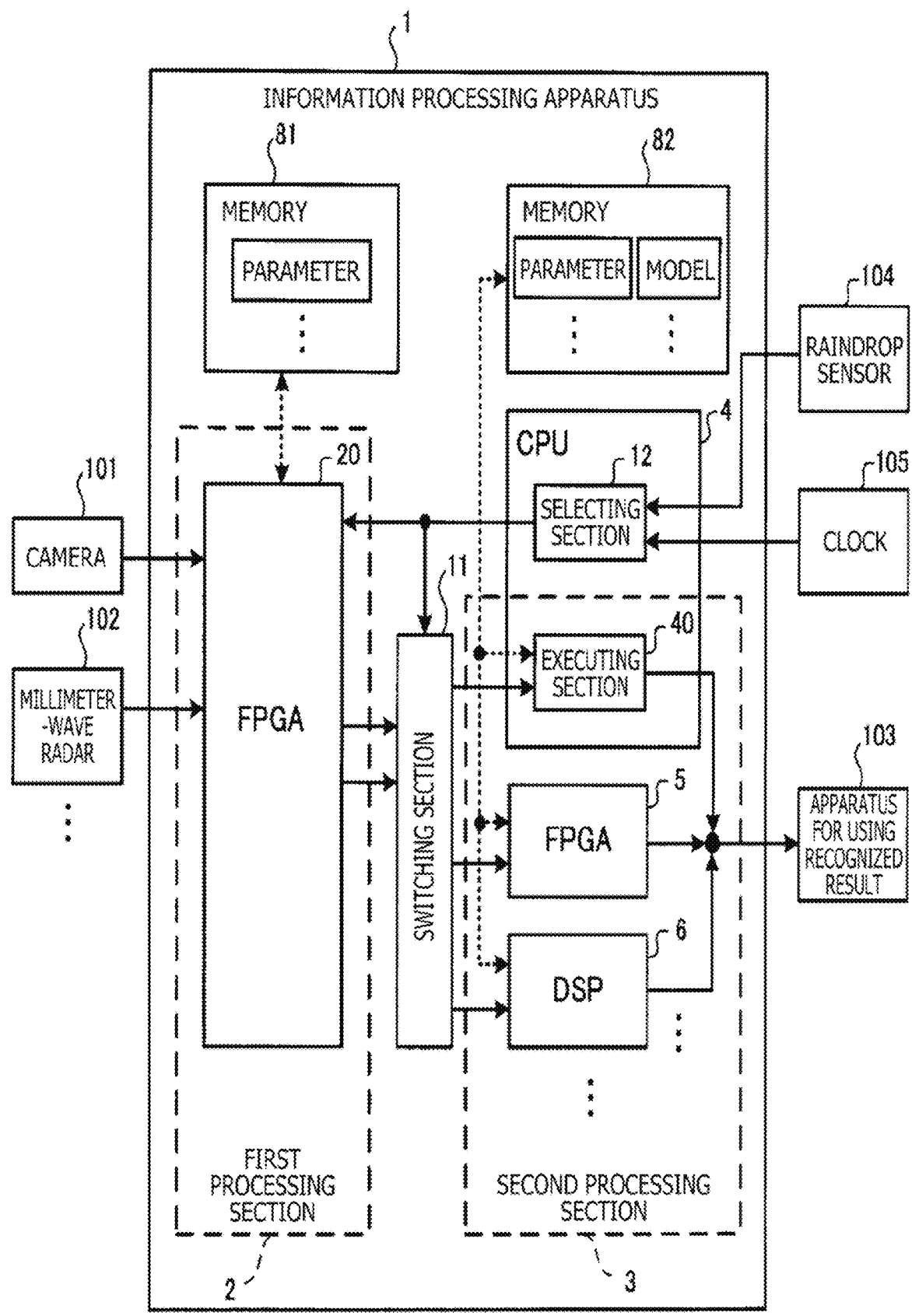
FIG. 2 is a block diagram illustrating an example of a makeup of the information processing apparatus according to the present disclosure.

Next, an example of a makeup of the information processing apparatus 1 will be described below with reference to FIG. 2. FIG. 2 is a block diagram illustrating an example of the makeup of the information processing apparatus 1 according to the present disclosure. It is to be noted that, here, of the components illustrated in FIG. 2, those components which are identical to those illustrated in FIG. 1 are denoted by identical reference signs, and their redundant description will be omitted.

As illustrated in FIG. 2, the information processing apparatus 1 is connected to a plurality of sensors including the camera 101 and the millimeter-wave radar 102, the apparatus 103 for using a recognized result, a raindrop sensor 104, and a clock 105, for example.

The camera 101, for example, captures an image of a periphery of a vehicle on which the information processing apparatus 1 is mounted, and outputs image data of the captured image to the information processing apparatus 1. The millimeter-wave radar 102 receives a reflected wave from an object in response to a millimeter wave (radio wave) that it has sent to the periphery of the vehicle, and outputs millimeter-wave data according to the received reflected wave to the information processing apparatus 1. It is to be noted that the sensors connected to the information processing apparatus 1 may also include various sensors such as a LIDAR (Light Detection and Ranging) sensor and an ultrasonic sensor in addition to the camera 101 and the millimeter-wave radar 102.

As described above, the apparatus 103 for using a recognized result is an apparatus that uses the determined result about the vehicle from the information processing apparatus 1 for controlling the vehicle. The raindrop sensor 104 detects whether or not there is a raindrop applied to the vehicle and outputs information indicative of a detected result to the information processing apparatus 1. The clock 105 outputs information indicative of present time to the information processing apparatus 1.

The information processing apparatus 1 includes the first processing section 2, the second processing section 3, memories 81 and 82 (such as a storage unit), and a switching section 11 (such as a selector). A plurality of parameters stored in the memory 81 is parameters to be loaded into the FPGA 20 of the first processing section 2. A plurality of parameters and models stored in the memory 82 are parameters and/or models to be loaded into the CPU 4, the FPGA 5, and the DSP 6 of the second processing section 3. Specifically, a plurality of parameters and models stored in the memory 82 are loaded into the CPU 4 and the DSP 6. Only a plurality of parameters stored in the memory 82 is loaded into the FPGA 5.

These parameters are determined by a machine learning process performed in advance based on deep learning. An example of the machine learning process for determining the parameters will be described later with reference to FIGS. 3, 6, and 7.

Parameters are loaded from the memory 81 into the FPGA 20 of the first processing section 2. When loaded with the parameters, the FPGA 20 functions as, for example, an image feature quantity extractor 21a, to be described later, that extracts a feature quantity of image data input from the camera 101, and a clear weather millimeter-wave feature quantity extractor 22a and a rainy weather millimeter-wave feature quantity extractor 22b that extract a feature quantity of millimeter-wave data input from the millimeter-wave radar 102 (see FIGS. 8 and 9). Operational examples of the first processing section 2 will be described later with reference to FIGS. 4, 8, and 9.

The CPU 4 includes the selecting section 12 and an executing section 40. The selecting section 12 selects, according to environmental information of the vehicle that is input from the raindrop sensor 104 and the clock 105, parameters to be loaded from the memory 81 into the FPGA 20.

Moreover, the selecting section 12 selects, according to environmental information of the vehicle that is input from the raindrop sensor 104 and the clock 105, parameters and/or models to be loaded from the memory 82 into the executing section 40 and the FPGA 5 and the DSP 6 of the second processing section 3. The selecting section 12 may be implemented by hardware for physically switching connections or may be implemented by software for switching connections by way of programmed processing.

The executing section 40 functions as, for example, the determiner C41, the determiner D42, or the like described above, according to the parameters and models loaded from the memory 82. Furthermore, the FPGA 5 of the second processing section 3 functions as, for example, the determiner E 51, the determiner F 52, or the like described above, according to the parameters loaded from the memory 82.

Furthermore, the DSP 6 functions as, for example, the determiner G 61, the determiner H62, or the like described above, according to the parameters and models loaded from the memory 82. Moreover, the selecting section 12 also performs a process for causing the switching section 11 to switch processors in the second processing section 3 for connection to the FPGA 20 of the first processing section 2. An operational example of the second processing section 3 will be described later with reference to FIGS. 4, 8, and 9.

(3. First Machine Learning Process)

Figure 3:
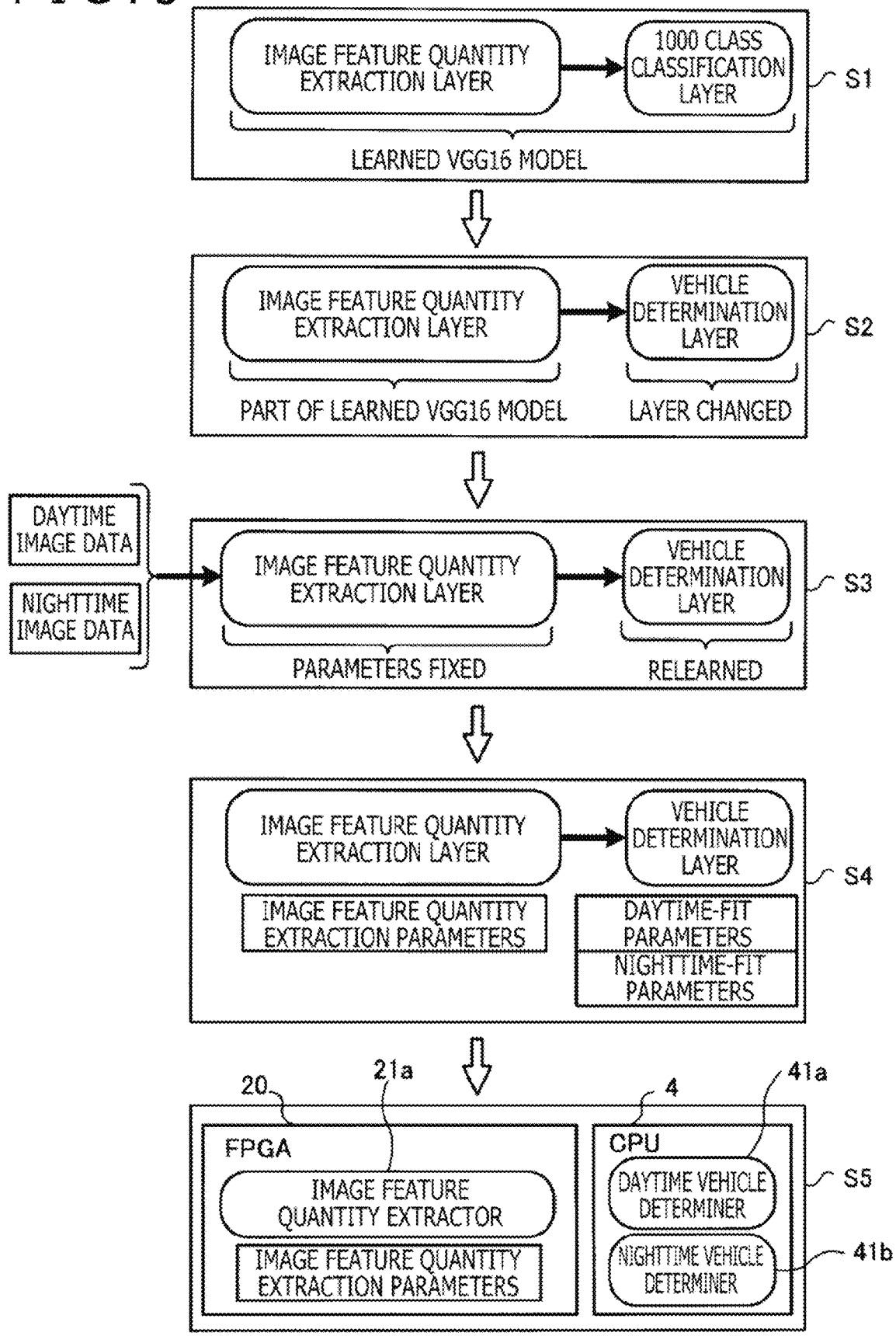
FIG. 3 is an explanatory diagram of a first machine learning process according to the present disclosure.

Next, an example of a first machine learning process that is carried out by the information processing apparatus 1 will be described below with reference to FIG. 3. FIG. 3 is an explanatory diagram of a first machine learning process according to the present disclosure. In the case of determining whether a subject is a vehicle or a non-vehicle from an image captured by the camera 101, an image captured in daytime and an image captured in nighttime are significantly different as to feature quantities of the images, such as the luminance and the way in which the subject looks.

Consequently, the information processing apparatus 1 requires different image recognition processes in the case of determining whether a subject is a vehicle or a non-vehicle from an image captured in daytime and in the case of determining whether a subject is a vehicle or a non-vehicle from an image captured in nighttime.

However, if the information processing apparatus 1 stores software for determining whether a subject is a vehicle or a non-vehicle from an image captured in daytime and software determining whether a subject is a vehicle or a non-vehicle from an image captured in nighttime, then the amount of stored data increases. Accordingly, in order to perform a 2 class classification task for determining whether a subject is a vehicle or a non-vehicle in input images in daytime and nighttime, the information processing apparatus 1 carries out, in advance, the first machine learning process, to be described below.

As illustrated in FIG. 3, in the first machine learning process, a general learned VGG 16 model is prepared as a 1000 class classification model for an object (step S1). The VGG 16 model includes an image feature quantity extraction layer as a front stage for extracting an image feature quantity from image data and a 1000 class classification layer as a rear stage for classifying a subject in a 1000 class from the feature quantity extracted by the image feature quantity extraction layer.

Following this, the VGG 16 model is separated into the image feature quantity extraction layer, i.e., part of the learned VGG 16 model, and the 1000 class classification layer. Then, layer changing is performed to connect a vehicle determination layer for classifying (determining) a subject in 2 classes representing a vehicle or a non-vehicle, to the image feature quantity extraction layer (step S2). Thereafter, daytime image data and nighttime image data are input to a learning model where the vehicle determination layer is connected to the image feature quantity extraction layer, causing the learning model to perform the machine learning process (step S3).

At this time, image feature quantity extraction parameters that are machined-learned to extract a feature quantity suitable for recognizing a general object from an image have been input in advance to the image feature quantity extraction layer of the VGG 16. In the first machine learning process, therefore, image feature quantity extraction parameters for the image feature quantity extraction layer are fixed, and parameters for the vehicle determination layer are relearned.

Now, the daytime image data input to the learning model include a number of image data representing a vehicle image captured in daytime and a number of image data not representing a vehicle image captured in daytime. Furthermore, the nighttime image data include a number of image data representing a vehicle image captured in nighttime and a number of image data not representing a vehicle image captured in nighttime.

When the daytime image data and the nighttime image data are input to the learning model, daytime-fit parameters suitable for determining a vehicle accurately in daytime and nighttime-fit parameters suitable for determining a vehicle accurately in nighttime are obtained as parameters for the vehicle determination layer (step S4).

Consequently, by installing the image feature quantity extraction layer that poses a higher processing load than the vehicle determination layer into the FPGA 20 and loading the image feature quantity extraction parameters thereinto, the feature quantity extractor model A21, for example, can function as the image feature quantity extractor 21a (step S5).

In addition, by installing the vehicle determination layer into the CPU 4 and loading the daytime-fit parameters thereinto, the determiner C41 can function as a daytime vehicle determiner 41a, and by loading the nighttime-fit parameters into the CPU 4, the determiner D42 can function as a nighttime vehicle determiner 42a (step S5).

In this manner, the information processing apparatus 1 can restrain the amount of data of stored software from increasing by sharing the image feature quantity extraction layer and the image feature quantity extraction parameters for day and night. Moreover, the information processing apparatus 1 is able to determine highly accurately whether a subject in an image is a vehicle or a non-vehicle regardless of day and night by selectively using the daytime-fit parameters and the nighttime-fit parameters in day and night.

(4. First Operational Example of the Information Processing Apparatus)

Figure 4:
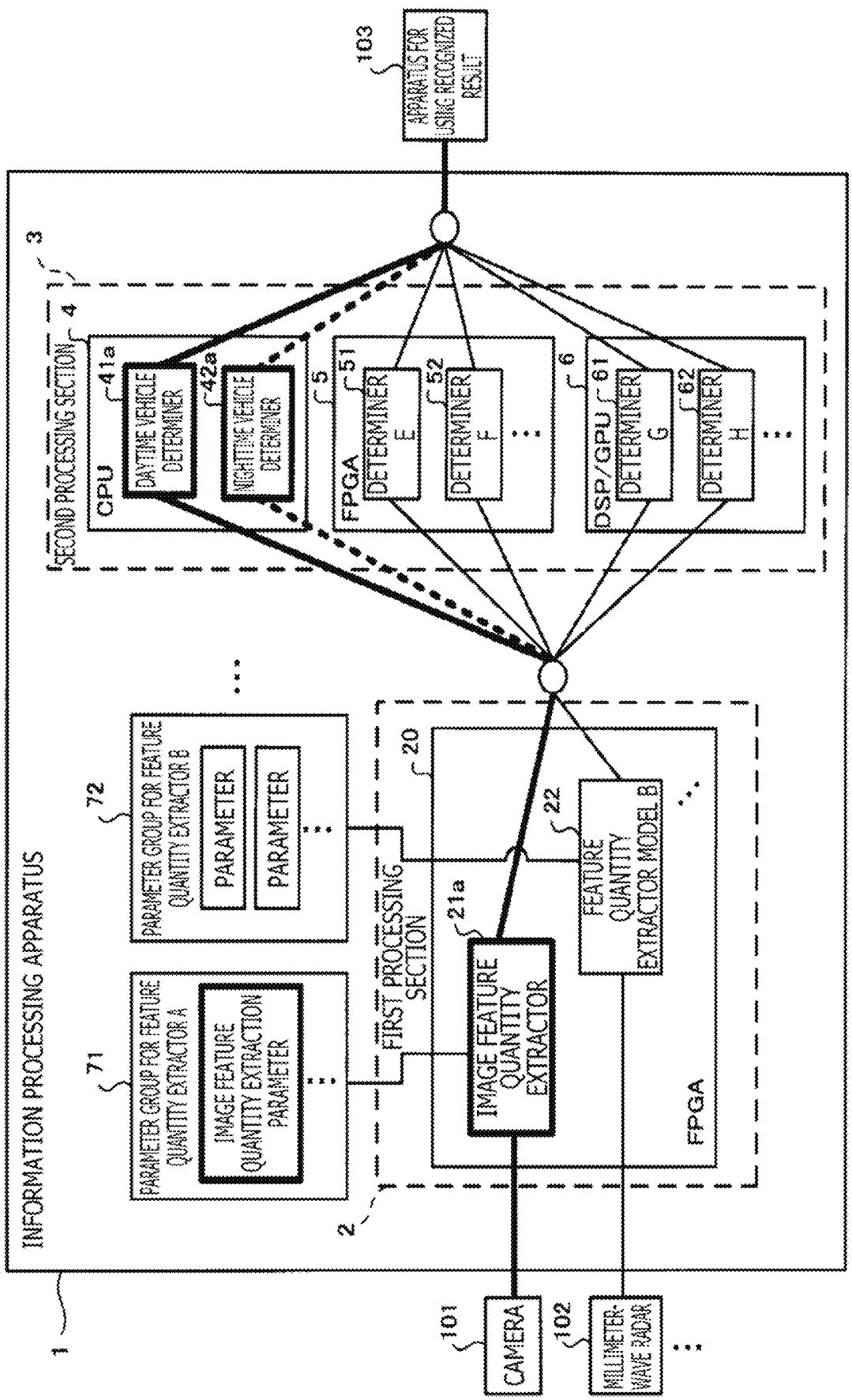
FIG. 4 is an explanatory diagram of a first operational example of the information processing apparatus according to the present disclosure.

Next, a first operational example of the information processing apparatus 1 will be described below with reference to FIG. 4. FIG. 4 is an explanatory diagram of the first operational example of the information processing apparatus 1 according to the present disclosure.

As illustrated in FIG. 4, in the case of determining whether a subject in an image captured by the camera 101 is a vehicle or a non-vehicle, the information processing apparatus 1 loads the image feature quantity extraction parameters from the parameter group 71 for the feature quantity extractor A into the feature quantity extractor model A21 of the FPGA 20. The information processing apparatus 1 is thus able to cause the feature quantity extractor model A21 to function as the image feature quantity extractor 21a.

Thereafter, the information processing apparatus 1 determines whether the present time is daytime or nighttime on the basis of information input from the clock 105, for example. Then, if the information processing apparatus 1 decides that the present time is daytime, then the information processing apparatus 1 connects the output of the image feature quantity extractor 21a and the input of the daytime vehicle determiner 41a of the CPU 4 to each other.

Specifically, the information processing apparatus 1 loads the daytime-fit parameters referred to above into the CPU 4, causing the CPU 4 to function as the daytime vehicle determiner 41a, and then connects the FPGA 20 and the CPU 4 to each other. In the information processing apparatus 1, therefore, the output of the image feature quantity extractor 21a and the input of the daytime vehicle determiner 41a of the CPU 4 are connected to each other in terms of software.

Thereafter, the information processing apparatus 1 inputs image data acquired from the camera 101 to the image feature quantity extractor 21a, and outputs the determined result about a vehicle from the daytime vehicle determiner 41a to the apparatus 103 for using a recognized result.

Furthermore, if the information processing apparatus 1 decides that the present time is nighttime on the basis of information input from the clock 105, then the information processing apparatus 1 reconnects the output of the image feature quantity extractor 21a to the input of the nighttime vehicle determiner 42a of the CPU 4. Specifically, the information processing apparatus 1 loads the nighttime-fit parameters referred to above into the CPU 4, causing the CPU 4 to function as the nighttime vehicle determiner 42a, and then connects the FPGA 20 and the CPU 4 to each other.

In the information processing apparatus 1, therefore, the output of the image feature quantity extractor 21a is reconnected to the input of the nighttime vehicle determiner 42a of the CPU 4 in terms of software. Thereafter, the information processing apparatus 1 inputs image data acquired from the camera 101 to the image feature quantity extractor 21a, and outputs the determined result about a vehicle from the nighttime vehicle determiner 42a to the apparatus 103 for using a recognized result. The apparatus 103 for using a recognized result uses the determined result about a vehicle input from the information processing apparatus 1 for controlling an emergency automatic brake system or an automatic drive system, for example.

Incidentally, though the clock 105 is used to determine whether the present time is daytime or nighttime in the present embodiment, means for determining whether the present time is daytime or nighttime is not limited to a clock, and an illuminance sensor or the like for measuring the illuminance of ambient light around the vehicle, for example, may be used as such means, or determining means based on image data acquired from the camera 101 may be used as such means.

(5. Processing Sequence Executed in a Case where the Information Processing Apparatus Operates According to the First Operational Example)

Figure 5:
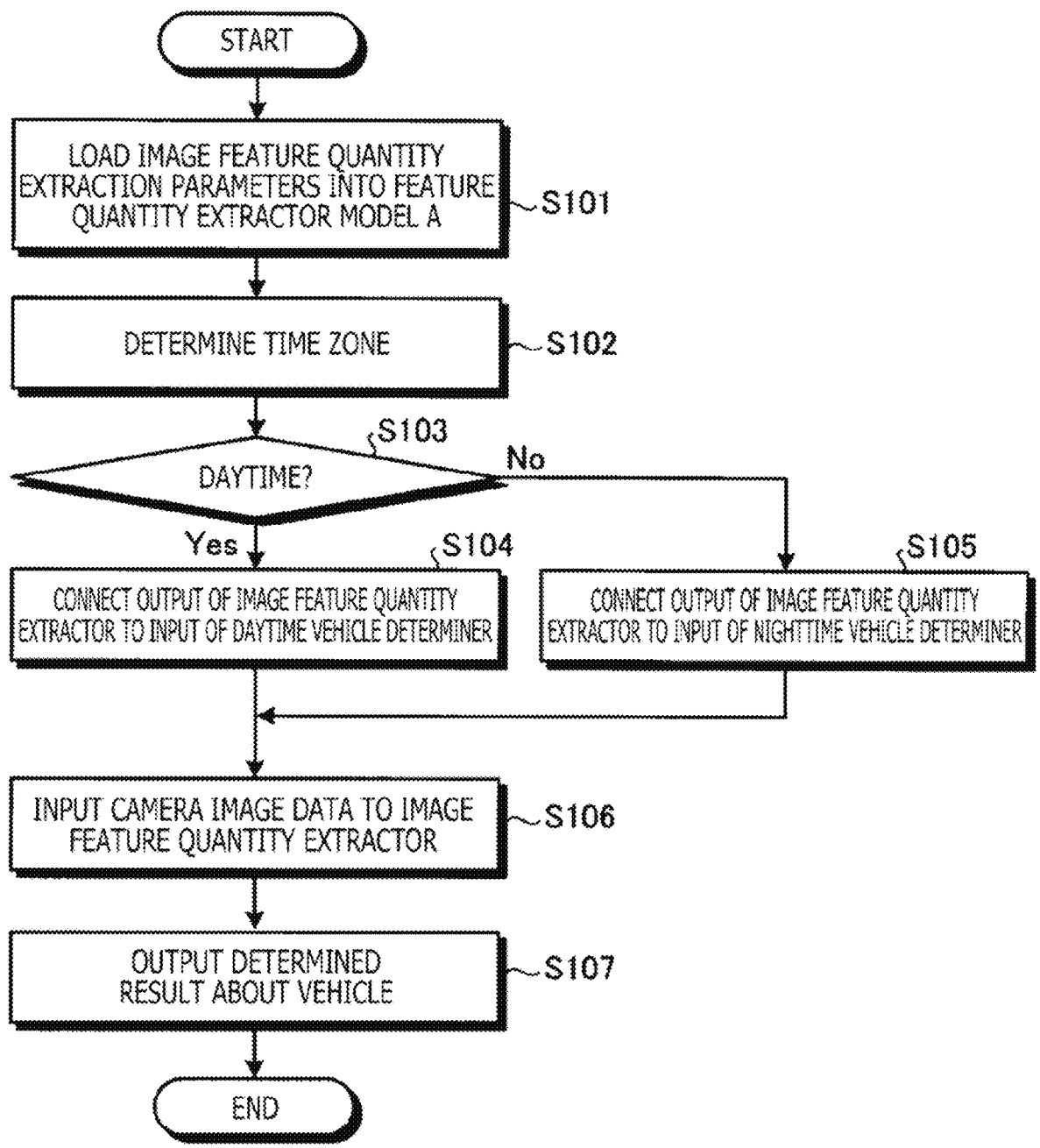
FIG. 5 is a flowchart of a processing sequence executed in a case where the information processing apparatus according to the present disclosure operates according to the first operational example.

Next, an example of a processing sequence executed in a case where the information processing apparatus 1 operates according to the first operational example will be described below with reference to FIG. 5. FIG. 5 is a flowchart of a processing sequence executed in a case where the information processing apparatus 1 according to the present disclosure operates according to the first operational example.

As illustrated in FIG. 5, in a case where the information processing apparatus 1 is to operate according to the first operational example, the information processing apparatus 1 first loads the image feature quantity extraction parameters into the feature quantity extractor model A21 (step S101). The feature quantity extractor model A21 thus functions as the image feature quantity extractor 21a. Thereafter, the information processing apparatus 1 determines a time zone (step S102).

Following this, the information processing apparatus 1 decides whether or not the determined time zone is daytime (step S103). Then, if the information processing apparatus 1 decides that the time zone is daytime (step S103, Yes), then the information processing apparatus 1 connects the output of the image feature quantity extractor 21a to the input of the daytime vehicle determiner 41a (step S104), and lets processing go to step S106.

Furthermore, if the information processing apparatus 1 decides that the time zone is not daytime, but nighttime (step S103, No), then the information processing apparatus 1 connects the output of the image feature quantity extractor 21a to the input of the nighttime vehicle determiner 42a (step S105), and lets processing go to step S106.

In step S106, the information processing apparatus 1 inputs camera image data to the image feature quantity extractor 21a. Thereafter, the information processing apparatus 1 outputs the determined result about a vehicle to the apparatus 103 for using a recognized result (step S107), whereupon the processing sequence is ended. Subsequently, the information processing apparatus 1 executes the processing of steps S102 through S107 repeatedly until the power supply is turned off.

(6. Second Machine Learning Process)

Figure 6:
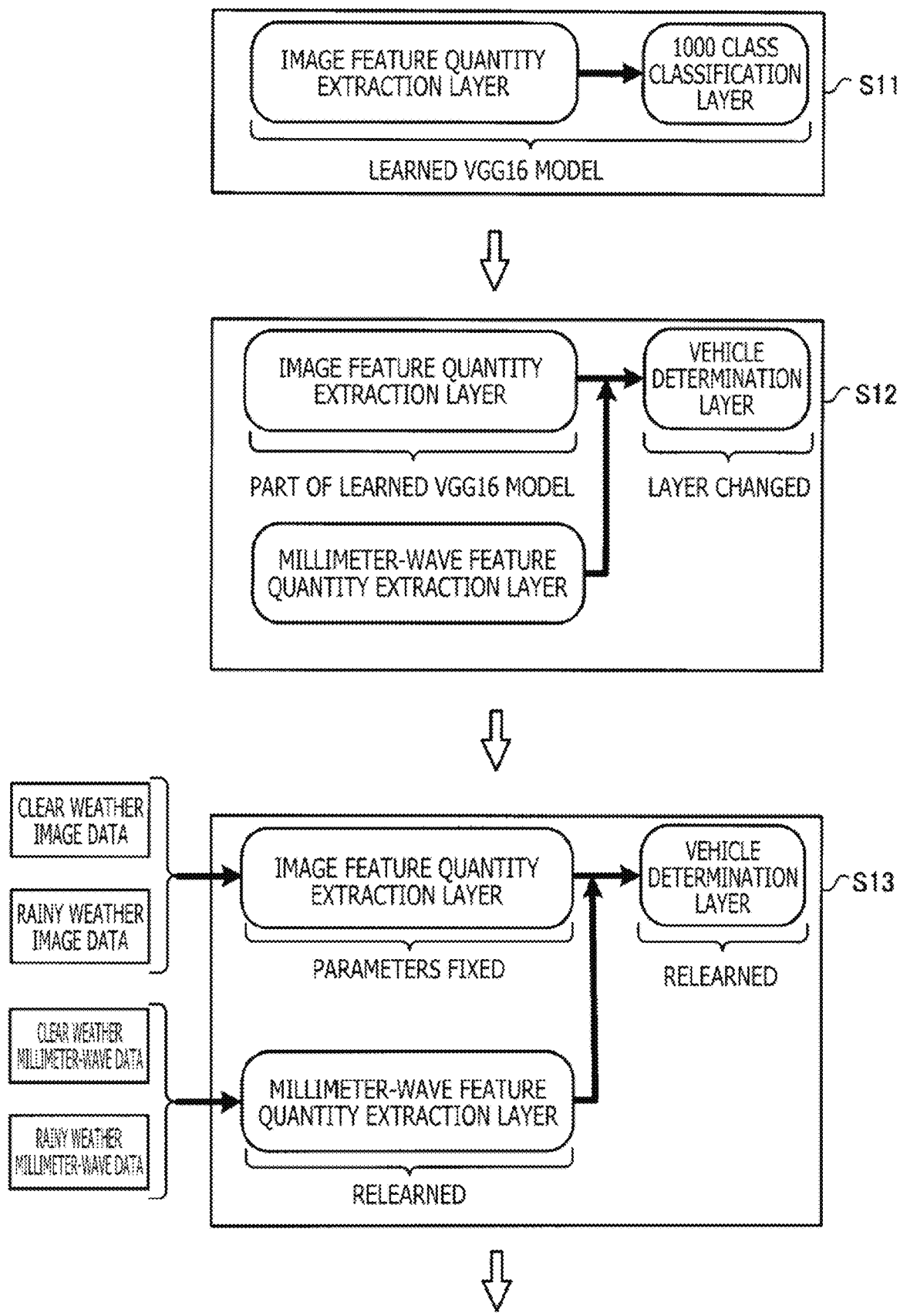
FIG. 6 is an explanatory diagram of a second machine learning process according to the present disclosure.

Next, an example of a second machine learning process that is carried out by the information processing apparatus 1 will be described below with reference to FIGS. 6 and 7. FIGS. 6 and 7 are explanatory diagrams of a second machine learning process according to the present disclosure. The information processing apparatus 1 is capable of recognizing a vehicle more accurately by way of sensor fusion based on the camera 101 and the millimeter-wave radar 102 than recognizing a vehicle on the basis of the camera 101 alone.

However, the radio wave that the millimeter-wave radar 102 radiates into the periphery in rainy weather is attenuated compared with the radio wave that the millimeter-wave radar 102 radiates into the periphery in clear weather. Therefore, in a case where the information processing apparatus 1 is to determine whether a subject is a vehicle or a non-vehicle from millimeter-wave data input from the millimeter-wave radar 102, feature quantities of millimeter-wave data such as a reception intensity are widely different between millimeter-wave data input in clear weather and millimeter-wave data input in rainy weather.

Consequently, the information processing apparatus 1 requires different recognition processes in a case where it determines whether a subject is a vehicle or a non-vehicle from millimeter-wave data input in clear weather and in a case where it determines whether a subject is a vehicle or a non-vehicle from millimeter-wave data input in rainy weather.

However, if the information processing apparatus 1 stores software for determining whether a subject is a vehicle or a non-vehicle from millimeter-wave data input in clear weather and software for determining whether a subject is a vehicle or a non-vehicle from millimeter-wave data input in rainy weather, then the amount of data stored in the information processing apparatus 1 increases.

Accordingly, in order to perform a 2 class classification task for determining whether a subject is a vehicle or a non-vehicle in input images in clear weather and rainy weather on the basis of image data and millimeter-wave data, the information processing apparatus 1 carries out, in advance, the second machine learning process, to be described below.

As illustrated in FIG. 6, in the second machine learning process, a general learned VGG 16 model is prepared as a 1000 class classification model for an object (step S11). The VGG 16 model includes an image feature quantity extraction layer as a front stage for extracting an image feature quantity from image data and a 1000 class classification layer as a rear stage for classifying a subject in a 1000 class from the feature quantity extracted by the image feature quantity extraction layer.

Then, the VGG 16 model is separated into the image feature quantity extraction layer, i.e., part of the learned VGG 16 model, and the 1000 class classification layer. Then, layer changing is performed to connect a vehicle determination layer for classifying (determining) a subject in 2 classes representing a vehicle or a non-vehicle, to the image feature quantity extraction layer (step S12).

Furthermore, a millimeter-wave feature quantity extraction layer is prepared, and the output of the millimeter-wave feature quantity extraction layer is connected to the input of the vehicle determination layer (step S12). Thereafter, clear weather image data and rainy weather image data are input to a learning model of the image feature quantity extraction layer, and clear weather millimeter-wave data and rainy weather millimeter-wave data are input to a learning model of the millimeter-wave feature quantity extraction layer, causing the learning model to perform the machine learning process (step S13).

At this time, image feature quantity extraction parameters that are machined-learned to extract a feature quantity suitable for recognizing a general object from an image have been input in advance to the image feature quantity extraction layer of the VGG 16. In the second machine learning process, therefore, parameters for the image feature quantity extraction layer are fixed, and parameters for the vehicle determination layer and parameters for millimeter-wave feature quantity extraction layer are relearned.

Now, the clear weather image data input to the learning model include a number of image data representing a vehicle image captured in clear weather and a number of image data not representing a vehicle image captured in clear weather. Furthermore, the rainy weather image data include a number of image data representing a vehicle image captured in rainy weather and a number of image data not representing a vehicle image captured in rainy weather.

Moreover, the clear weather millimeter-wave data include a number of millimeter-wave data detected by the millimeter-wave radar 102 in a location where there is a vehicle in clear weather and a number of millimeter-wave data detected by the millimeter-wave radar 102 in a location where there is no vehicle in clear weather.

Moreover, the rainy weather millimeter-wave data include a number of millimeter-wave data detected by the millimeter-wave radar 102 in a location where there is a vehicle in rainy weather and a number of millimeter-wave data detected by the millimeter-wave radar 102 in a location where there is no vehicle in rainy weather.

When the clear weather millimeter-wave data are input to the learning model of the millimeter-wave feature quantity extraction layer, clear weather millimeter-wave feature quantity extraction parameters suitable for accurately extracting a feature quantity of clear weather millimeter-wave data are obtained as parameters for the millimeter-wave feature quantity extraction layer (step S14).

In addition, when the rainy weather millimeter-wave data are input to the learning model of the millimeter-wave feature quantity extraction layer, rainy weather millimeter-wave feature quantity extraction parameters suitable for accurately extracting a feature quantity of rainy weather millimeter-wave data are obtained as parameters for the millimeter-wave feature quantity extraction layer (step S14).

Furthermore, when the clear weather image data are input to the learning model of the image feature quantity extraction layer, and the clear weather millimeter-wave data are input to the learning model of the millimeter-wave feature quantity layer, clear weather-fit parameters suitable for determining a vehicle accurately in clear weather are obtained as parameters for the vehicle determination layer (step S14).

Furthermore, when the rainy weather image data are input to the learning model of the image feature quantity extraction layer, and the rainy weather millimeter-wave data are input to the learning model of the millimeter-wave feature quantity layer, rainy weather-fit parameters suitable for determining a vehicle accurately in rainy weather are obtained as parameters for the vehicle determination layer (step S14).

Consequently, by installing the image feature quantity extraction layer that poses a higher processing load than the vehicle determination layer into the FPGA 20 and loading the image feature quantity extraction parameters thereinto, the feature quantity extractor model A 21 can, for example, function as the image feature quantity extractor 21a (step S15).

In addition, by installing the millimeter-wave feature quantity extraction layer that poses a high processing load into the FPGA 20 and loading the clear weather millimeter-wave feature quantity extraction parameters thereinto, the feature quantity extractor model B 22 can, for example, function as the clear weather millimeter-wave feature quantity extractor 22a (step S15).

In addition, by installing the millimeter-wave feature quantity extraction layer into the FPGA 20 and loading the rainy weather millimeter-wave feature quantity extraction parameters thereinto, the feature quantity extractor model B 22 can, for example, function as the rainy weather millimeter-wave feature quantity extractor 22b (step S15).

In addition, by installing the vehicle determination layer into the CPU 4 and loading the clear weather-fit parameters thereinto, the determiner C 41 can function as a clear weather vehicle determiner 41b, and by loading the rainy weather-fit parameters into the CPU 4, the determiner D 42 can function as a rainy weather vehicle determiner 42b (step S15).

Then, in the case of a clear weather, the information processing apparatus 1 connects the outputs of the image feature quantity extractor 21a and the clear weather millimeter-wave feature quantity extractor 22a and the input of the clear weather vehicle determiner 41b to each other. In the case of a rainy weather, the information processing apparatus 1 connects the outputs of the image feature quantity extractor 21a and the rainy weather millimeter-wave feature quantity extractor 22b and the input of the rainy weather vehicle determiner 42b to each other.

In this manner, the information processing apparatus 1 can restrain the amount of data of stored software from increasing by sharing the image feature quantity extraction layer and the image feature quantity extraction parameters for clear weather and rainy weather.

Moreover, the information processing apparatus 1 is able to determine highly accurately whether or not there is a vehicle regardless of clear weather and rainy weather by selectively using the clear weather-fit parameters, the clear weather millimeter-wave feature quantity extraction parameters, rainy weather-fit parameters, and rainy weather millimeter-wave feature quantity extraction parameters in clear weather and rainy weather.

(7. Second Operational Example of the Information Processing Apparatus)

Figure 8:
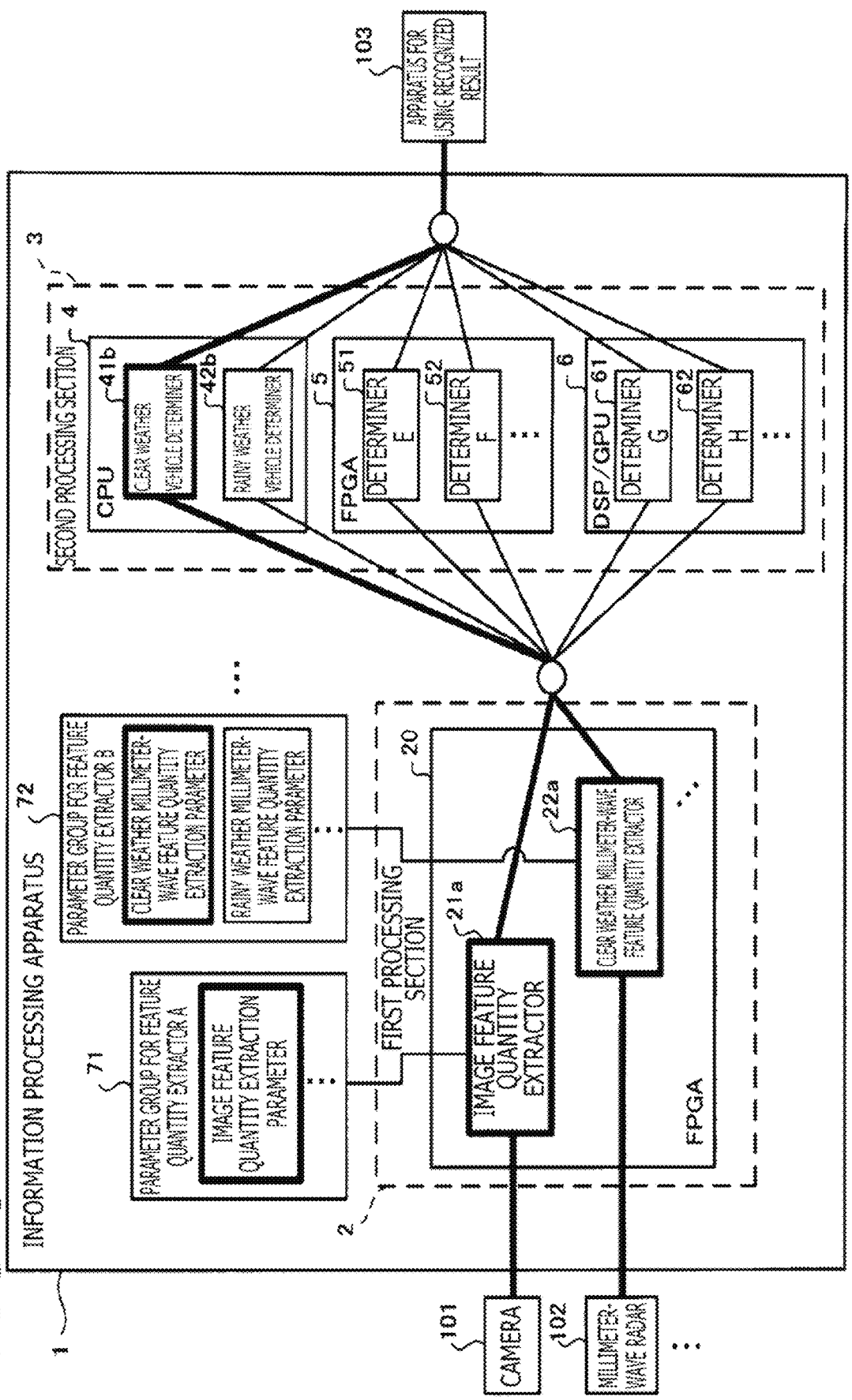
FIG. 8 is an explanatory diagram of a second operational example of the information processing apparatus according to the present disclosure.
Figure 9:
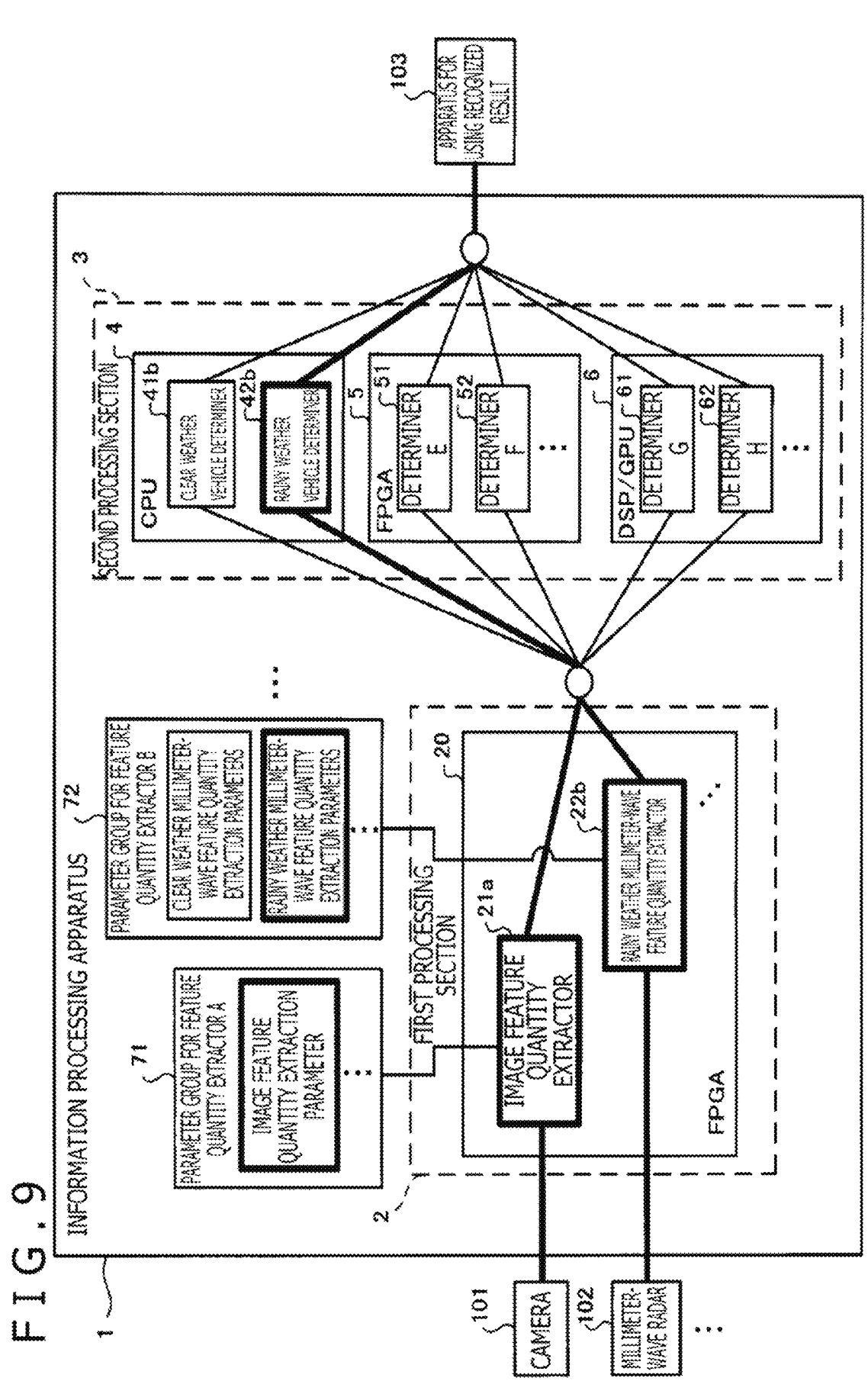
FIG. 9 is an explanatory diagram of the second operational example of the information processing apparatus according to the present disclosure.

Next, a second operational example of the information processing apparatus 1 will be described below with reference to FIGS. 8 and 9. FIGS. 8 and 9 are explanatory diagrams of the second operational example of the information processing apparatus 1 according to the present disclosure.

For example, in a case where the information processing apparatus 1 is to determine whether a subject in an image captured by the camera 101 is a vehicle or a non-vehicle on the basis of image data and millimeter-wave data, the information processing apparatus 1 first determines whether it is a clear weather or a rainy weather at present on the basis of information input from the raindrop sensor 104.

Incidentally, means for determining whether it is a clear weather or a rainy weather at present is not limited to the raindrop sensor 104 and means for determining the operating status of a windshield wiper or determining means based on image data acquired from the camera 101 may be used as such means.

Then, in a case where the information processing apparatus 1 decides that it is a clear weather, the information processing apparatus 1 loads the image feature quantity extraction parameters from the parameter group 71 for the feature quantity extractor A into the feature quantity extractor model A21 of the FPGA 20, as illustrated in FIG. 8. The information processing apparatus 1 is thus able to cause the feature quantity extractor model A21 to function as the image feature quantity extractor 21a.

Furthermore, the information processing apparatus 1 loads the clear weather millimeter-wave feature quantity extraction parameters from the parameter group 72 for the feature quantity extractor B into the feature quantity extractor model B22 of the FPGA 20. The information processing apparatus 1 is thus able to cause the feature quantity extractor model B22 to function as the clear weather millimeter-wave feature quantity extractor 22a. Then, the information processing apparatus 1 connects the output of the image feature quantity extractor 21a, the output of the clear weather millimeter-wave feature quantity extractor 22a, and the input of the clear weather vehicle determiner 41b of the CPU 4 to each other.

Specifically, the information processing apparatus 1 loads the clear weather-fit parameters referred to above into the CPU 4, causing the CPU 4 to function as the clear weather vehicle determiner 41b, and then connects the FPGA 20 and the CPU 4 to each other. In the information processing apparatus 1, therefore, the output of the image feature quantity extractor 21a, the output of the clear weather millimeter-wave feature quantity extractor 22a, and the input of the clear weather vehicle determiner 41b of the CPU 4 are connected to each other in terms of software.

Thereafter, the information processing apparatus 1 inputs image data acquired from the camera 101 to the image feature quantity extractor 21a, inputs millimeter-wave data acquired from the millimeter-wave radar 102 to the clear weather millimeter-wave feature quantity extractor 22a, and outputs the determined result about a vehicle from the clear weather vehicle determiner 41b to the apparatus 103 for using a recognized result.

Furthermore, if the information processing apparatus 1 decides that it is a rainy weather at present on the basis of information input from the raindrop sensor 104, then the information processing apparatus 1 loads the rainy weather millimeter-wave feature quantity extraction parameters from the parameter group 72 for the feature quantity extractor B into the feature quantity extractor model B22 of the FPGA 20, as illustrated in FIG. 9. The information processing apparatus 1 is thus able to cause the feature quantity extractor model B22 to function as the rainy weather millimeter-wave feature quantity extractor 22b. Then, the information processing apparatus 1 connects the output of the image feature quantity extractor 21a, the output of the rainy weather millimeter-wave feature quantity extractor 22b, and the input of the rainy weather vehicle determiner 42b to each other.

Specifically, the information processing apparatus 1 loads the rainy weather-fit parameters referred to above into the CPU 4, causing the CPU 4 to function as the rainy weather vehicle determiner 42b, and then connects the FPGA 20 and the CPU 4 to each other. In the information processing apparatus 1, therefore, the output of the image feature quantity extractor 21a, the output of the rainy weather millimeter-wave feature quantity extractor 22b, and the input of the rainy weather vehicle determiner 42b of the CPU 4 are connected to each other in terms of software.

Thereafter, the information processing apparatus 1 inputs image data acquired from the camera 101 to the image feature quantity extractor 21a, inputs millimeter-wave data acquired from the millimeter-wave radar 102 to the rainy weather millimeter-wave feature quantity extractor 22b, and outputs the determined result about a vehicle from the rainy weather vehicle determiner 42b to the apparatus 103 for using a recognized result. The apparatus 103 for using a recognized result uses the determined result about a vehicle input from the information processing apparatus 1 for controlling an emergency automatic brake system or an automatic drive system, for example.

(8. Processing Sequence Executed in a Case where the Information Processing Apparatus Operates According to the Second Operational Example)

Figure 10:
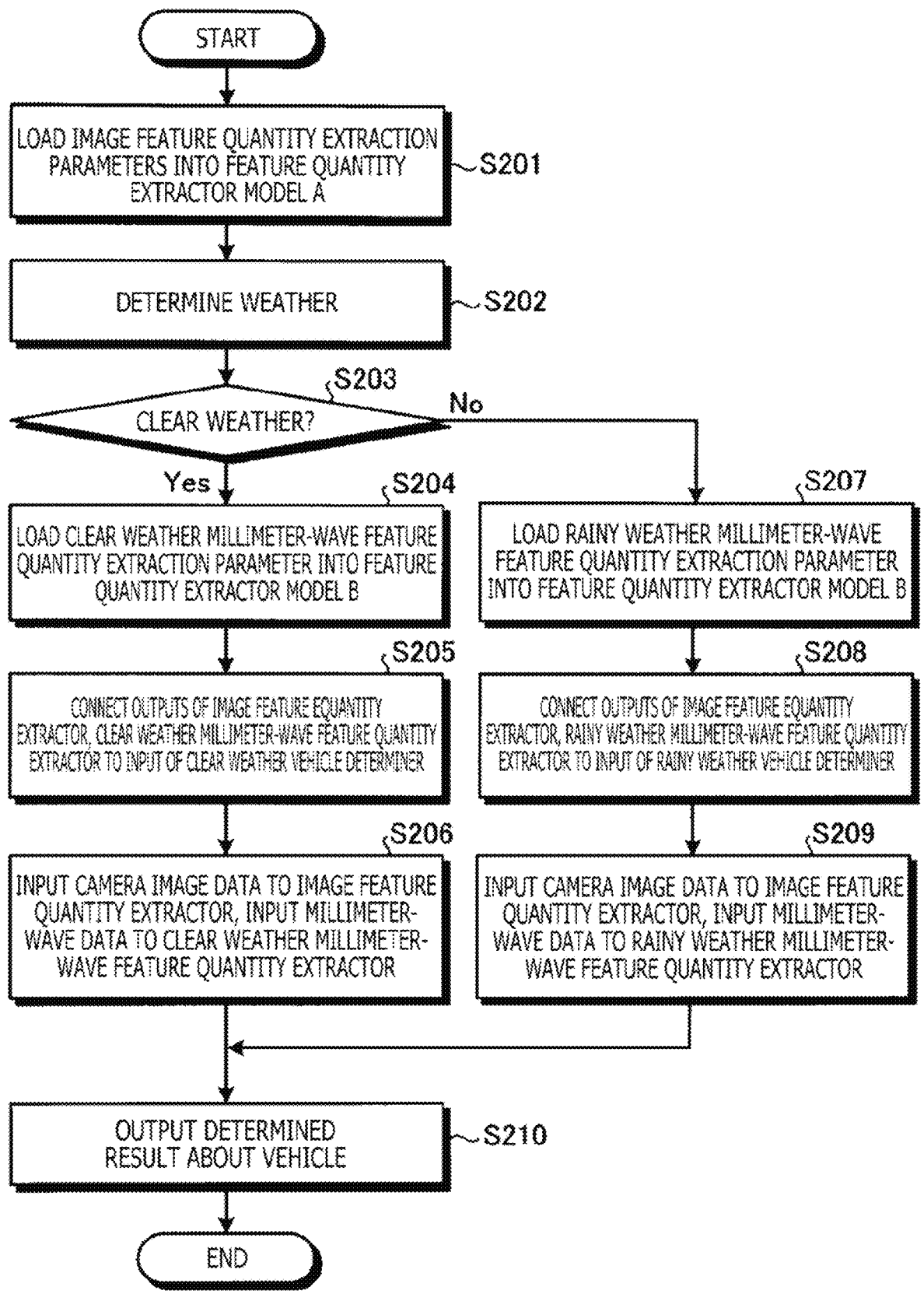
FIG. 10 is a flowchart of a processing sequence executed in a case where the information processing apparatus according to the present disclosure operates according to the second operational example.

Next, an example of a processing sequence executed in a case where the information processing apparatus 1 operates according to the second operational example will be described below with reference to FIG. 10. FIG. 10 is a flowchart of a processing sequence executed in a case where the information processing apparatus 1 according to the present disclosure operates according to the second operational example.

As illustrated in FIG. 10, in a case where the information processing apparatus 1 is to operate according to the second operational example, the information processing apparatus 1 first loads the image feature quantity extraction parameters into the feature quantity extractor model A 21 (step S201). The feature quantity extractor model A 21 thus functions as the image feature quantity extractor 21a. Thereafter, the information processing apparatus 1 determines a weather (step S202).

Following this, the information processing apparatus 1 decides whether or not the determined weather is a clear weather (step S203). Then, if the information processing apparatus 1 decides that the weather is a clear weather (step S203, Yes), then the information processing apparatus 1 loads the clear weather millimeter-wave feature quantity extraction parameters into the feature quantity extractor model B22 (step S204). The feature quantity extractor model B22 thus functions as the clear weather millimeter-wave feature quantity extractor 22a.

Following this, the information processing apparatus 1 connects the output of the image feature quantity extractor 21a and the output of the clear weather millimeter-wave feature quantity extractor 22a to the input of the clear weather vehicle determiner 41b (step S205). Then, the information processing apparatus 1 inputs camera image data to the image feature quantity extractor 21a, inputs millimeter-wave data to the clear weather millimeter-wave feature quantity extractor 22a (step S206), and lets processing go to step S210.

Furthermore, if the information processing apparatus 1 decides that the weather is not a clear weather, but a rainy weather (step S203, No), then the information processing apparatus 1 loads the rainy weather millimeter-wave feature quantity extraction parameters into the feature quantity extractor model B22 (step S207). The feature quantity extractor model B22 thus functions as the rainy weather millimeter-wave feature quantity extractor 22b.

Following this, the information processing apparatus 1 connects the output of the image feature quantity extractor 21a and the output of the rainy weather millimeter-wave feature quantity extractor 22b to the input of the rainy weather vehicle determiner 42b (step S208). Then, the information processing apparatus 1 inputs camera image data to the image feature quantity extractor 21a, inputs millimeter-wave data to the rainy weather millimeter-wave feature quantity extractor 22b (step S209), and lets processing go to step S210.

In step S210, the information processing apparatus 1 outputs the determined result about a vehicle to the apparatus 103 for using a recognized result, whereupon the processing sequence is ended. Subsequently, the information processing apparatus 1 executes the processing of steps S202 through S210 repeatedly until the power supply is turned off.

(9. Advantages)

The information processing apparatus 1 has the first processing section 2, the second processing section 3, and the selecting section 12. The first selecting section 2 carries out a first process on data input from the sensors, i.e., the camera 101 and the millimeter-wave radar 102. The second processing section 3 carries out a plurality of second processes different from each other that poses a processing load lower than the first process, on the data on which the first process has been carried out by the first processing section 2. The selecting section 12 selects, according to a predetermined condition, a second process to be carried out by the second processing section 3. The information processing apparatus 1 is thus capable of restraining the amount of data of stored software from increasing.

Furthermore, the selecting section 12 selects a second process according to peripheral environmental conditions. The information processing apparatus 1 is thus capable of carrying out an optimum second process according to peripheral environmental conditions, such as daytime, nighttime, clear weather, and rainy weather, for example.

Furthermore, the first processing section 2 has feature quantity extractors, i.e., the image feature quantity extractor 21a and the clear weather millimeter-wave feature quantity extractor 22a, that extract feature quantities of data input from the sensors, i.e., the camera 101 and the millimeter-wave radar 102. The feature quantity extraction parameters that have been learned by the machine learning process are input to the feature quantity extractors, i.e., the image feature quantity extractor 21a and the clear weather millimeter-wave feature quantity extractor 22a. The feature quantity extractors, i.e., the image feature quantity extractor 21a and the clear weather millimeter-wave feature quantity extractor 22a, are thus able to extract appropriate feature quantities according to tasks from data input from the sensors, i.e., the camera 101 and the millimeter-wave radar 102.

Moreover, the information processing apparatus 1 has a feature quantity extraction parameter storage unit, i.e., the memory 81, that stores a plurality of feature quantity extraction parameters different from each other. Feature quantity extraction parameters selected from the feature quantity extraction parameter storage unit, i.e., the memory 81, according to a predetermined condition are input to the feature quantity extractors, i.e., the image feature quantity extractor 21a and the clear weather millimeter-wave feature quantity extractor 22a. The feature quantity detector is thus able to extract feature quantities of various data simply when input parameters are changed.

Moreover, the second processing section 3 has determiners, i.e., the daytime vehicle determiner 41a, the nighttime vehicle determiner 42a, the clear weather vehicle determiner 41b, and the rainy weather vehicle determiner 42b, that determine a target to be detected by the sensors. Determination parameters that have been learned by the machine learning process are input to the determines. The second processing section 3 is thus able to accurately determine a target to be detected.

Moreover, the information processing apparatus 1 has a determination parameter storage unit, i.e., the memory 82, that stores a plurality of determination parameters different from each other. Determination parameters selected from the determination parameter storage unit according to a predetermined condition are input to the determiners. The determiners are thus able to determine various targets to be detected simply when input parameters are changed.

Furthermore, the first processing section 2 has a first feature quantity extractor, i.e., the image feature quantity extractor 21a, to which data are input from a first sensor, i.e., the camera 101, and a second feature quantity extractor, i.e., the clear weather millimeter-wave feature quantity extractor 22a, to which data are input from a second sensor, i.e., the millimeter-wave radar 102. The first feature quantity extractor and the second feature quantity extractor output data on which the first process has been carried out to the determiners. The information processing apparatus 1 is thus capable of determining a target to be detected more accurately by way of sensor fusion.

Moreover, the selecting section 12 selects a second process according to determined daytime or nighttime. The information processing apparatus 1 is thus capable of carrying out an optimum second process according to daytime or nighttime.

Moreover, feature quantity extraction parameters, i.e., clear weather millimeter-wave feature quantity extraction parameters and rainy weather millimeter-wave feature quantity extraction parameters, selected from the feature quantity extraction parameter storage unit according to determined clear weather or rainy weather are input to the feature quantity extractors, i.e., the clear weather millimeter-wave feature quantity extractor 22a and the rainy weather millimeter-wave feature quantity extractor 22b. The feature quantity extractors are thus able to extract appropriate feature quantities according to clear weather and rainy weather.

Moreover, an information processing method that is carried out by a computer includes a first processing step, a second processing step, and a selecting step. The first processing step performs a first process on data input from a sensor. The second processing step performs a plurality of second processes different from each other that poses a processing load lower than the first process, on the data on which the first process has been carried out by the first processing step. The selecting step selects, according to a predetermined condition, a second process to be carried out by the second processing step. In this manner, the amount of data of software stored in the computer is restrained from increasing.

Moreover, an information processing program causes a computer to execute a first processing sequence, a second processing sequence, and a selecting sequence. The first processing sequence performs a first process on data input from a sensor. The second processing sequence performs a plurality of second processes different from each other that poses a processing load lower than the first process, on the data on which the first process has been carried out by the first processing sequence. The selecting sequence selects, according to a predetermined condition, a second process to be carried out by the second processing sequence. In this manner, the information processing program is able to restrain the amount of data of software stored in the computer from increasing.

The advantages referred to in the present description are merely illustrative and not restrictive. The present disclosure may also offer other advantages.

Furthermore, according to the present disclosure, switching between recognizers on the basis of determined daytime and nighttime and switching between recognizers on the basis of determined clear weather and rainy weather have been described in detail. However, the present technology is not limited to such details. For example, it is possible to switch between a plurality of recognizers to cope with various environmental situations, i.e., to switch between recognizers on the basis of whether or not the vehicle is in a tunnel, to switch between recognizers on the basis of whether the vehicle is in a city area or a non-city area, to switch between recognizers on the basis of whether the vehicle is on an expressway or a local road, and the like. The present technology may also take the following arrangements:

(A1)
An information processing apparatus including:
  a first processing section that carries out a first process on data input from a sensor;
  a second processing section that carries out a plurality of second processes different from each other that poses a processing load lower than the first process, on the data on which the first process has been carried out by the first processing section; and
  a selecting section that selects, according to a predetermined condition, the second process to be carried out by the second processing section.

(A2)
The information processing apparatus according to (A1) above, in which
  the selecting section selects the second process according to a peripheral environmental condition.

(A3)

The information processing apparatus according to (A1) or (A2) above, in which the first processing section has a feature quantity extractor that extracts a feature quantity of the data input from the sensor; and a feature quantity extraction parameter that has been learned by a machine learning process is input to the feature quantity extractor.

(A4)

The information processing apparatus according to (A3) above, including:

a feature quantity extraction parameter storage unit that stores a plurality of the feature quantity extraction parameters different from each other, in which the feature quantity extraction parameter selected from the feature quantity extraction parameter storage unit according to the predetermined condition is input to the feature quantity extractor.

(A5)

The information processing apparatus according to (A3) or (A4) above, in which the second processing section has a determiner that determines a target to be detected by the sensor; and a determination parameter that has been learned by a machine learning process is input to the determiner.

(A6)

The information processing apparatus according to (A5) above, including:

a determination parameter storage unit that stores a plurality of the determination parameters different from each other, in which the determination parameter selected from the determination storage unit according to the predetermined condition is input to the determiner.

(A7)

The information processing apparatus according to (A5) or (A6) above, in which the first processing section has:

a first feature quantity extractor to which data are input from a first sensor; and a second feature quantity extractor to which data are input from a second sensor, and the first feature quantity extractor and the second feature quantity extractor output data on which the first process has been carried out to the determiner.

(A8)

The information processing apparatus according to any one of (A1) through (A7) above, in which the selecting section selects the second process according to determined daytime or nighttime.

(A9)

The information processing apparatus according to (A4) above, in which the feature quantity extraction parameter selected from the feature quantity extraction parameter storage unit according to determined clear weather or rainy weather is input to the feature quantity extractor.

(A10)

An information processing method that is carried out by a computer, including:

a first processing step that performs a first process on data input from a sensor;

a second processing step that performs a plurality of second processes different from each other that poses a processing load lower than the first process, on the data on which the first process has been carried out by the first processing step; and a selecting step that selects, according to a predetermined condition, a second process to be carried out by the second processing step.

(A11)

An information processing program that causes a computer to execute:

a first processing sequence that performs a first process on data input from a sensor;

a second processing sequence that performs a plurality of second processes different from each other that poses a processing load lower than the first process, on the data on which the first process has been carried out by the first processing sequence; and a selecting sequence that selects, according to a predetermined condition, a second process to be carried out by the second processing sequence.

(B1)

An information processing apparatus comprising:

at least one first processor configured to carry out a first process on data input from at least one sensor to produce first processed data;

a selector configured to select, according to a first predetermined condition, at least one of a plurality of second processes; and at least one second processor configured to receive the first processed data from the at least one first processor and to carry out the selected at least one of the plurality of second processes on the first processed data to produce second processed data, each of the plurality of second processes having a lower processing load than the first process.

(B2)

The information processing apparatus according to (B1), wherein the selector is configured to select at least one of the plurality of second processes according to a peripheral environmental condition as the first predetermined condition.

(B3)

The information processing apparatus according to (B1) or (B2), wherein the at least one first processor is further configured to extract one or more features of the data input from the at least one sensor based, at least in part, on a feature extraction parameter that has been learned by a machine learning process.

(B4)

The information processing apparatus according to (B3), further comprising:

at least one storage unit configured to store a plurality of feature extraction parameters different from each other, wherein the at least one first processor is further configured to select, according to a second predetermined condition, the feature extraction parameter from the plurality of feature extraction parameters stored in the at least one storage unit.

(B5)

The information processing apparatus according to any one of (B1) through (B4), wherein the at least one second processor is further configured to determine an object detected by the at least one sensor based, at least in part, on a determination parameter that has been learned by a machine learning process.

(B6)

The information processing apparatus according to (B5), further comprising:
at least one storage unit configured to store a plurality of determination parameters different from each other,
wherein the at least one second processor is further configured to select, according to the first predetermined condition, the determination parameter from the plurality of determination parameters stored in the at least one storage unit.

(B7)

The information processing apparatus according to (B5), wherein
the at least one sensor includes a first sensor and a second sensor, and
the at least one first processor is further configured to:
receive first data from the first sensor; and
receive second data from the second sensor;
carry out the first process on the first data and the second data to produce the first processed data; and
provide the first processed data to the at least one second processor.

(B8)

The information processing apparatus according to any one of (B1) through (B7), wherein
the selector is configured to select at least one of the plurality of second processes according to a time of day as the first predetermined condition.

(B9)

The information processing apparatus according to (B4), wherein
the feature extraction parameter is selected from the plurality of feature extraction parameters stored in the at least one storage unit according to a peripheral environmental condition as the second predetermined condition.

(B10)

The information processing apparatus according to (B9), wherein
the feature extraction parameter is selected from the plurality of feature extraction parameters stored in the at least one storage unit according to weather information.

(B11)

The information processing apparatus according to any one of (B1) through (B10), wherein
the information processing apparatus is mounted on a vehicle.

(B12)

The information processing apparatus according to (B11), wherein
the at least one second processor is further configured to
determine an object detected by the at least one sensor based, at least in part, on a determination parameter that has been learned by a machine learning process, and
output a signal based, at least in part, on the determined object to at least one of an Advanced Driver Assistance System or an automatic drive system of the vehicle.

(B13)

The information processing apparatus according to (B7), wherein
the first sensor is an image sensor, and
the second sensor is at least one of a millimeter-wave radar, a light detection and ranging sensor, or an ultrasonic sensor.

(B14)

The information processing apparatus according to any one of (B1) through (B12), wherein
the at least one first processor comprises an FPGA, and
the at least one second processor comprises at least one of an FPGA, a CPU, a DSP, or a GPU.

(B15)

The information processing apparatus according to any one of (B1) through (B14), wherein
the first process comprises a multi-dimensional product-sum operation, and
the second process comprises a classification of an object or recurrence.

(B16)

The information processing apparatus according to (B5), wherein
the at least one second processor is configured to determine an object detected by the at least one sensor based, at least in part, on a determination model that has been trained by a machine learning process.

(B17)

The information processing apparatus according to any one of (B1) through (B16), wherein
the plurality of second processes are different from each other.

(B18)

An information processing method that is carried out by a computer, the method comprising:
performing a first process on data input from at least one sensor to produce first processed data;
selecting, according to a predetermined condition, at least one of a plurality of second processes, wherein the plurality of second processes are different from each other and each of the second processes has a lower processing load than the first process; and
performing the selected at least one of the plurality of second processes on the first processed data to produce second processed data.

(B19)

An information processing program that causes a computer to execute:
a first processing sequence that performs a first process on data input from at least one sensor to produce first processed data;
a selecting sequence that selects, according to a predetermined condition, at least one of a plurality of second processes, wherein the plurality of second processes are different from each other and each of the second processes has a lower processing load than the first process; and
a second processing sequence that performs the selected at least one of the plurality of second processes on the first processed data to produce second processed data.

REFERENCE SIGNS LIST

1 Information processing apparatus
11 Switching section
12 Selecting section
2 First processing section
20 FPGA
21 Feature quantity extractor model A
21a Image feature quantity extractor
22 Feature quantity extractor model B
22a Clear weather millimeter-wave feature quantity extractor 22b Rainy weather millimeter-wave feature quantity extractor
3 Second processing section
4 CPU
40 Executing section
41 Determiner C
41a Daytime vehicle determiner
41b Clear weather vehicle determiner
42 Determiner D
42a Nighttime vehicle determiner
42b Rainy weather vehicle determiner
5 FPGA
51 Determiner E
52 Determiner F
6 DSP
61 Determiner G
62 Determiner H
71 Parameter group for feature quantity extractor A
72 Parameter group for feature quantity extractor B
81, 82 Memory
101 Camera
102 Millimeter-wave radar
103 Apparatus for using a recognized result
104 Raindrop sensor
105 Clock

The invention claimed is:

1. An information processing apparatus comprising:
at least one first processor configured to carry out a first process on data input from at least one sensor to produce first processed data;
a selector configured to select, according to a first predetermined condition, at least one of a plurality of second processes; and
at least one second processor configured to receive the first processed data from the at least one first processor and to carry out the selected at least one of the plurality of second processes on the first processed data to produce second processed data, each process of the plurality of second processes having a lower processing load than the first process.

2. The information processing apparatus according to claim 1, wherein
the selector is configured to select at least one of the plurality of second processes according to a peripheral environmental condition as the first predetermined condition.

3. The information processing apparatus according to claim 1, wherein
the at least one first processor is further configured to extract one or more features of the data input from the at least one sensor based, at least in part, on a feature extraction parameter that has been learned by a machine learning process.

4. The information processing apparatus according to claim 3, further comprising:
at least one storage unit configured to store a plurality of feature extraction parameters different from each other,
wherein the at least one first processor is further configured to select, according to a second predetermined condition, the feature extraction parameter from the plurality of feature extraction parameters stored in the at least one storage unit.

5. The information processing apparatus according to claim 4, wherein
the feature extraction parameter is selected from the plurality of feature extraction parameters stored in the at least one storage unit according to a peripheral environmental condition as the second predetermined condition.

6. The information processing apparatus according to claim 5, wherein
the feature extraction parameter is selected from the plurality of feature extraction parameters stored in the at least one storage unit according to weather information.

7. The information processing apparatus according to claim 1, wherein
the at least one second processor is further configured to determine an object detected by the at least one sensor based, at least in part, on a determination parameter that has been learned by a machine learning process.

8. The information processing apparatus according to claim 7, further comprising:
at least one storage unit configured to store a plurality of determination parameters different from each other,
wherein the at least one second processor is further configured to select, according to the first predetermined condition, the determination parameter from the plurality of determination parameters stored in the at least one storage unit.

9. The information processing apparatus according to claim 7, wherein
the at least one sensor includes a first sensor and a second sensor, and
the at least one first processor is further configured to:
receive first data from the first sensor; and
receive second data from the second sensor;
carry out the first process on the first data and the second data to produce the first processed data; and
provide the first processed data to the at least one second processor.

10. The information processing apparatus according to claim 9, wherein
the first sensor is an image sensor, and
the second sensor is at least one of a millimeter-wave radar, a light detection and ranging sensor, or an ultrasonic sensor.

11. The information processing apparatus according to claim 7, wherein
the at least one second processor is configured to determine an object detected by the at least one sensor based, at least in part, on a determination model that has been trained by a machine learning process.

12. The information processing apparatus according to claim 1, wherein
the selector is configured to select at least one of the plurality of second processes according to a time of day as the first predetermined condition.

13. The information processing apparatus according to claim 1, wherein the information processing apparatus is mounted on a vehicle.

14. The information processing apparatus according to claim 13, wherein
the at least one second processor is further configured to determine an object detected by the at least one sensor based, at least in part, on a determination parameter that has been learned by a machine learning process, and
output a signal based, at least in part, on the determined object to at least one of an Advanced Driver Assistance System or an automatic drive system of the vehicle.

15. The information processing apparatus according to claim 1, wherein
the at least one first processor comprises an FPGA, and
the at least one second processor comprises at least one of an FPGA, a CPU, a DSP, or a GPU.

16. The information processing apparatus according to claim 1, wherein
the first process comprises a multi-dimensional product-sum operation, and
the second process comprises a classification of an object or recurrence.

17. The information processing apparatus according to claim 1, wherein the plurality of second processes are different from each other.

18. An information processing method that is carried out by a computer, the method comprising:
performing a first process on data input from at least one sensor to produce first processed data;
selecting, according to a predetermined condition, at least one of a plurality of second processes, wherein the plurality of second processes are different from each other and each process of the plurality of second processes has a lower processing load than the first process; and
performing the selected at least one of the plurality of second processes on the first processed data to produce second processed data.

19. At least one non-transitory computer-readable storage medium storing processor executable instructions that, when executed by at least one computer hardware processor, cause the at least on computer hardware processor to preform:
a first processing sequence that performs a first process on data input from at least one sensor to produce first processed data;
a selecting sequence that selects, according to a predetermined condition, at least one of a plurality of second processes, wherein the plurality of second processes are different from each other and each process of the plurality of second processes has a lower processing load than the first process; and
a second processing sequence that performs the selected at least one of the plurality of second processes on the first processed data to produce second processed data.

* * * * *